United States Patent [19]

Raith et al.

[11] Patent Number: 4,980,907
[45] Date of Patent: Dec. 25, 1990

[54] TELECOMMUNICATION COMBINATION COMPRISING A TELEPOINT AND A PORTABLE RADIO TERMINAL

[75] Inventors: Alex K. Raith, Kista; Bengt Y. Persson, Djursholm; Dag E. Akerberg, Jarfalla, all of Sweden

[73] Assignee: Telefonaktiebolaget L M Ericsson, Stockholm, Sweden

[21] Appl. No.: 451,171

[22] Filed: Dec. 15, 1989

[51] Int. Cl.$^5$ .................. H04M 11/00; H04B 7/26
[52] U.S. Cl. ........................ 379/63; 379/58; 379/61; 379/210; 455/33; 455/56
[58] Field of Search .................. 379/50–63, 379/201, 210–212; 455/33, 49, 53, 54, 56, 95

[56] References Cited

U.S. PATENT DOCUMENTS

| | | | |
|---|---|---|---|
| 3,906,166 | 9/1975 | Cooper et al. | 379/59 |
| 4,658,416 | 4/1987 | Tanaka | 379/60 |
| 4,748,655 | 3/1988 | Thrower et al. | 379/60 |
| 4,829,554 | 5/1989 | Barnes et al. | 379/63 |

FOREIGN PATENT DOCUMENTS

| | | | |
|---|---|---|---|
| 2046556 | 11/1980 | United Kingdom | 379/63 |
| 2216319 | 10/1989 | United Kingdom | 379/58 |

OTHER PUBLICATIONS

Electronics & Wireless World, "A Cordless Future", by: Richard Lambley, Dec. 1988, pp. 1198, 1199.

Primary Examiner—Jin F. Ng
Assistant Examiner—Dwayne Bost
Attorney, Agent, or Firm—Burns, Doane, Swecker & Mathis

[57] ABSTRACT

The invention relates to a combination of a switched telecommunication network, a telepoint connected to the network and a portable radio terminal constituting part of a residential equipment or an extension to a PABX, the portable radio terminal when served by a telepoint radio transceiver instead of its residential or exchange radio transceiver uses the telepoint and the network for calling its residential base radio station or PABX and reporting serving telepoint to a location store, calls to the portable radio terminal thereafter being transferred by the residential equipment or PABX through the network to the telepoint in accordance with information in the location store, whereby the portable radio terminal or cordless telephone may be called through the network and telepoint when in proximity of a telepoint.

15 Claims, 3 Drawing Sheets

TELECOMMUNICATION COMBINATION COMPRISING A TELEPOINT AND A PORTABLE RADIO TERMINAL

TECHNICAL FIELD

This invention relates to the technical field of telecommunication. More precisely the invention relates to a combination comprising a switched telecommunication network, a telepoint connected to the switched telecommunication network and a portable radio terminal.

BACKGROUND OF THE INVENTION

Many public switched telecommunication networks, PSTN, are in use. Recent switched telecommunication networks are based on digital technology and are designed to be able to transmit various kinds of information at various speeds, e.g speech or data or video.

Public switched telecommunication networks, PSTN, generally comprise network subscriber stores for various information on subscribers to the network e.g identification, type, subscribed services, location or routing etc.

Public switched telecommunication networks generally also comprise means for connecting subscriber equipment to the network, and means for setting up calls to and from connected subscriber equipment in accordance with information in the network subscriber store. Such means may comprise exchanges interconnected by trunks.

When a public switched telecommunication network, PSTN, comprises plural distant local or transit exchanges there may be network subscriber stores at all local exchanges having allocated subscribers.

Some subscribers to a telecommunication network may be residential subscribers having a residential equipment connected by cables to a local exchange of the network.

Some residential subscriber equipments comprise a residential base radio station connected to the network by cable and a cordless telephone or portable radio terminal. The residential base radio station then comprises a residential radio transceiver for radio communication with the portable radio terminal or cordless telephone constituting part of the same subscriber residential equipment. This kind of residential subscriber equipment offers a user the freedom of making calls and receiving calls anywhere in his residence if within reach of his residential radio transceiver.

Other subscribers to a switched telecommunication network may be business subscribers. The subscriber equipment may then be a private automatic branch exchange, PABX, connected by cable to the telecommunication network and plural terminals or telephones constituting extensions to the private branch exchange.

Recently private automatic branch exchanges, PABX, comprising means for communication by radio with associated branch extensions have been suggested. The private automatic branch exchange, PABX, may then comprise an exchange switch connected by cable to a telecommunication network, exchange radio transceivers connected by cable to the exchange switch and portable radio terminals or cordless telephones for radio communication with the exchange radio transceivers. This kind of subscriber equipment may offer a staff the freedom of making calls and receiving calls anywhere in a business area of the subscriber if within reach of any of the exchange radio transceivers.

Many mobile radio communication systems of various kinds have o been suggested and are in use for various purposes. Cellular mobile radio communication systems may cover a very large geographical area offering a user with a mobile station a possibility to make calls at office, in residential areas and in some vehicles. A disadvantage of some mobile communication systems is the high cost, weight and size of mobile stations, the operators high charge for becoming a subscriber and the high charge for a call compared to corresponding costs for a subscriber using a terminal connected by cable to a fixed telecommunication network.

Telepoints have been suggested as a compromise between the low costs and low freedom of fixed telecommunication equipment and the high costs and freedom of cellular mobile radio communication systems. The telepoint concept offers users the possibility of small light-weight battery-powered- portable radio terminals for making calls anywhere via any fixed telepoint radio transceiver. The telepoint radio transceivers may be located at various places such as railway or underground stations, airports, pedestrian areas, squares, in official buildings etc. They are connected by cable to a switched telecommunication network. The telepoint concept requires comparatively little power consumption at the portable radio terminals whereby frequent change of battery is obviated. Information on UK telepoint standard may be found in "MPT 1375, COMMON AIR INTERFACE SPECIFICATION", DEPARTMENT OF TRADE AND INDUSTRY, LONDON 1989.

One major disadvantage of suggested telepoint systems is that a subscriber in proximity of a telepoint transceiver can not be called by an other subscriber to the telecommunication network to which the telepoint transceiver is connected. Thus a user of a radio terminal for telepoints can make calls but not receive calls.

SUMMARY OF THE INVENTION

One object of the present invention is to provide means enabling a subscriber to a switched telecommunication network with a portable radio terminal constituting part of a residential equipment or constituting an extension to a private branch exchange connected to the telecommunication network to use his portable radio terminal both for making calls and receiving calls at a telepoint connected to the telecommunication system.

Another object of the present invention is to provide a roaming function between various kinds of subscriber equipment connected to a public switched telecommunication network without introducing new procedures or means in the switched telecommunication network.

Still another object of the present invention is to provide means enabling both way call initiation at telepoints connected to a telecommunication network.

According to the invention existing network subscriber stores in a telecommunication network and/or new location stores in private branch exchanges or residential base radio stations are used for keeping track of portable subscriber radio terminals constituting extensions to the private branch exchanges or part of residential equipment.

According to the invention a portable radio terminal of a subscriber residential equipment comprises means for scanning of radio channels used by the residential radio transceiver or exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint transceiver or a branch exchange transceiver the residential base radio station constituting part of the same subscriber equipment or the network subscriber store and reporting to the residential location store or the network subscriber store the identity of serving radio transceiver when other than the residential radio transceiver constituting part of the same subscriber residential equipment.

According to the invention a portable radio terminal constituting an extension to a private branch exchange comprises means for scanning of radio channels used by exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint transceiver the private branch exchange to which the portable radio terminal constitutes an extension or the network subscriber store and reporting to the exchange location store or the network subscriber store the identity of serving radio transceiver when other than one of the exchange radio transceivers constituting part of the same branch exchange.

According to the invention the switched telecommunication network sets up a call to a subscriber according to the subscriber information in the network subscriber store.

According to the invention a residential base radio station, receiving a call to the portable radio terminal constituting part of the same subscriber equipment and having reported to the residential location store an other serving radio transceiver than that of the same subscriber equipment, forwards the call to the branch exchange or telepoint comprising the serving radio transceiver.

According to the invention a branch exchange, receiving a call to a portable radio terminal constituting an extension to the branch exchange and having reported to the exchange location store an other serving radio transceiver than one of the exchange radio transceivers of the same branch exchange, forwards the call to the telepoint or residential equipment comprising the choosen serving radio transceiver.

According to a preferred embodiment of the invention plural telepoint radio transceivers are connected to the switched o telecommunication network via a telepoint transceiver controller.

THE DRAWINGS

PREFERRED EMBODIMENTS OF THE INVENTION

Figure 1:
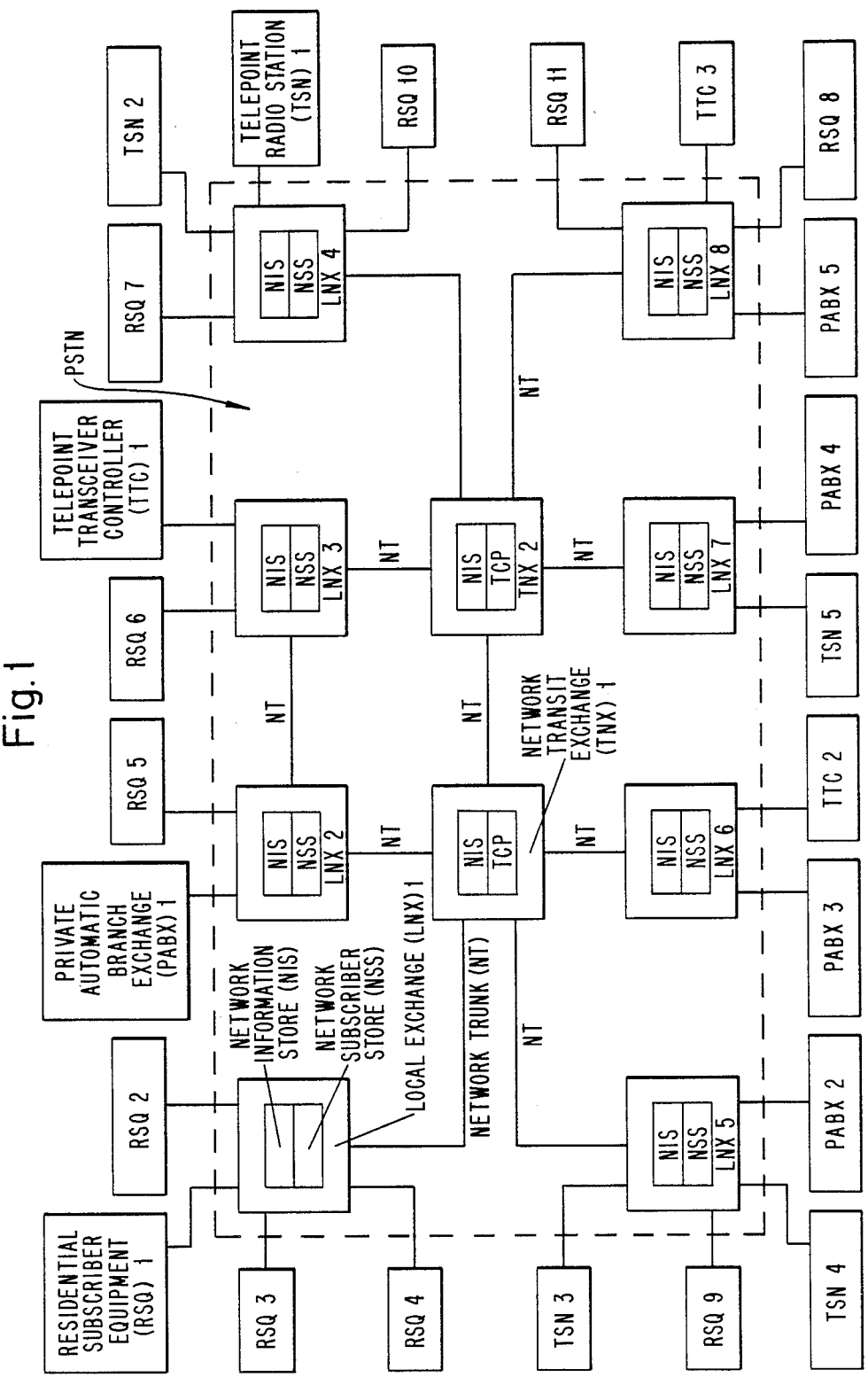
FIG. 1 illustrates a public switched telecommunication network and various kinds of subscriber equipment connected to a public switched telecommunication network.

FIG. 1 illustrates a public switched telecommunication network, PSTN, and various kinds of subscriber equipment connected to the network. The network comprises network local exchanges, LNX1 to LNX8, to which subscriber equipment may be connected by cables, network transit exchanges, TNX1 and TNX2, for switching calls, and network trunks, NT, for interconnection of local and transit exchanges.

The local and transit exchanges may comprise multiplexors, demultiplexors, processors ,stores as well as other usual network means. In particular the network may comprise at least one network subscriber store for information on subscribers to the network. Each local exchange may comprise a network subscriber store, NSS, for information on subscribers allocated to that local exchange, in particular subscribers having subscriber equipment connected to that local exchange by cables.

Exchanges of the network also comprise network information stores, NIS, for information on the network, in particular information on trunks to other exchanges, numbering, routing etc enabling exchange processors to set up calls to and from subscribers and disconnect calls. Local exchanges may also comprise means for transferring calls from a subscriber to an other subscriber.

Eleven residential subscriber equipments, RSQ1 to RSQ11, are connected by cables to the local exchanges LNX1 to LNX5 and LNX8 of the network. Five private automatic branch exchanges, PABX1 to PABX5, are connected by cables to the local exchanges LNX2 and LNX5 to LNX8 of the network. Five telepoint radio stations, TSN1 to TSN5, are connected by cables to the local exchanges LNX4 and LNX5 and LNX7 of the network. Three telepoint transceiver controllers, TTC1 to TTC3, are connected by cables to the local exchanges LNX3 and LNX6 and LNX8 of the network. At least in some aspects the RSQ, the PABX, the TSN and the TTC may all be considered as various kinds of subscriber equipment connected to the PSTN. The local exchanges network subscriber stores NSS comprise information on the subscribers having the equipment connected to them. In particular the stores may comprise information on type of subscription, e.g residential or business or telepoint, type of equipment connected, eg RSQ or PABX or TSN or TTC, and number of lines or bandwith connected to the network, e.g single analogue line, 64 kbit digital line, 1 Mbit digital line etc.

Figure 2:
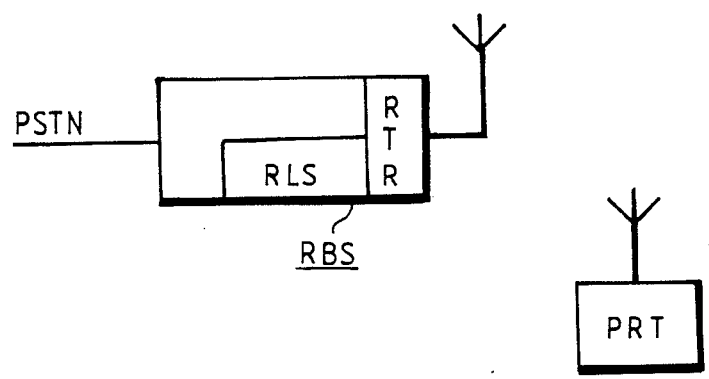
FIG. 2 illustrates a residential subscriber equipment connected to a public switched telecommunication network.

FIG. 2 illustrates a kind of residential subscriber equipment of particular interest to this invention connected to a PSTN. The residential equipment, RSQ, comprises a residential base radio station, RBS, connected to the PSTN by cable, and a residential portable radio terminal, PRT. The residential base radio station comprises a residential location store, RLS, for information on the portable radio terminal and a residential radio transceiver, RTR, for radio communication with the portable radio terminal. When a subscriber uses his residential portable radio terminal in his residence the portable radio terminal and the residential radio transceiver may cooperate in a well known way transmitting radio signals when setting up a call, during an ongoing call and when terminating a call. To the user the portable radio terminal and the residential radio transceiver may then appear to operate substantially in accordance with known residential cordless telephones. When a subscriber uses or has used his portable radio terminal distant from his residence but in proximity to an other radio transceiver, the portable radio terminal and the residential radio transceiver may however operate somewhat differently to be described later on.

Figure 3:
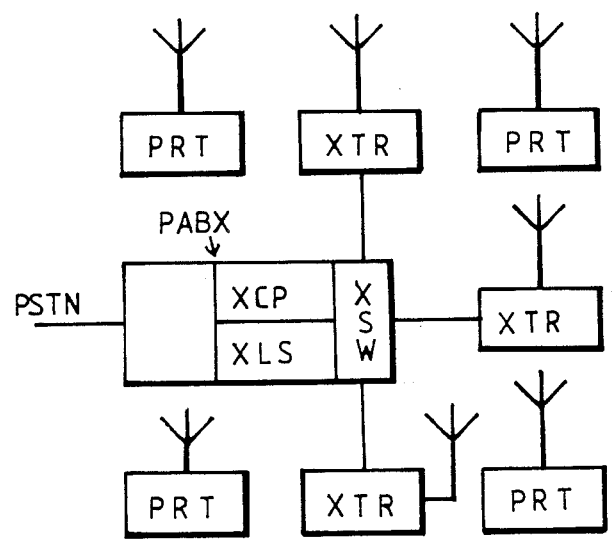
FIG. 3 illustrates a private branch exchange with extensions connected to a public switched telecommunication network.

FIG. 3 illustrates a private automatic branch exchange, PABX, of particular interest to this invention connected to a PSTN by cable and portable exchange radio terminals, PRT, constituting extensions to the PABX. The PABX comprises an exchange switch, XSW, an exchange location store, XLS, for information on portable radio terminals constituting extensions to the PABX, an exchange processor, XCP, and exchange radio transceivers, XTR, connected to the exchange switch by cables. The exchange radio transceivers are preferably plural channel transceivers. The exchange radio transceivers are located at various sites in the business area of the PABX subscriber for radio communication with the portable radio terminals constituting extensions. When setting up a call to or from a proximate portable radio terminal, during an ongoing call involving a proximate portable radio terminal, and when terminating such a call an exchange radio transceiver transmits radio signals to the portable radio terminal and receives radio signals from the portable radio terminal in a way similar to what is known in connection with cellular mobile radio systems. The PABX and the portable radio terminals cooperate to enable portable radio terminal roaming and handoff within the area covered by the exchange radio transceivers. The radio communication between the exchange portables and the exchange transceivers may incorporate known dynamic channel allocation procedures and known roaming and handoff procedures appropriate in comnnection with dynamic channel allocation, in which procedures decision on choice of serving transceiver and channel and handoff is taken by portable terminal. The PSTN is not at all involved in channel selection, roaming or handoff for a portable radio terminal served by an exchange radio transceiver of the PABX.

Figure 4:
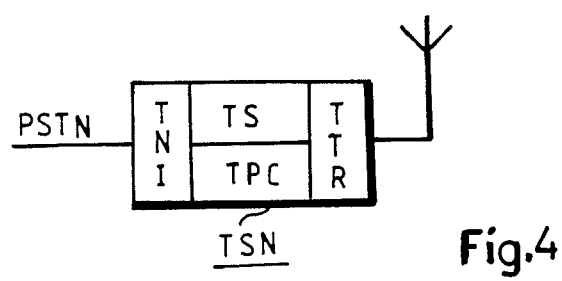
FIG. 4 illustrates a telepoint radio station connected to a public switched telecommunication network.

FIG. 4 illustrates a telepoint radio station, TSN, connected by cable to a PSTN. The telepoint radio station comprises a telepoint-network interface, TNI, a telepoint store, TS, a telepoint processor, TPC, and a multi channel telepoint radio transceiver, TTR. The telepoint radio transceiver may be similar to an exchange radio transceiver. When setting up or terminating a call from a proximate portable radio terminal the telepoint radio transceiver and the rest of the telepoint radio station may cooperate with each other and the PSTN in accordance with well known telepoint procedures. The telepoint radio transceiver and the rest of the telepoint radio station may however also cooperate with the PSTN in setting up a call from the PSTN to a proximate portable radio terminal in a way to be described later on.

Figure 5:
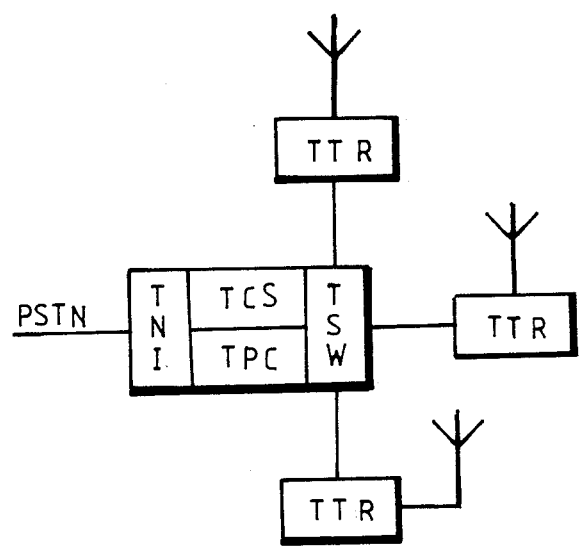
FIG. 5 illustrates a telepoint transceiver controller connected to a public switched telecommunication network and plural telepoint radio transceivers connected to the telepoint transceiver controller.

FIG. 5 illustrates a telepoint transceiver controller, TTC, connected to a PSTN by cable and controlling plural telepoint radio transceivers, TTR, connected to the telepoint transceiver controller by cables. The telepoint transceiver controller comprises a network-controller interface, TNI, a telepoint controller store, TCS, and a telepoint processor, TPC. Each telepoint radio transceiver connected to the transceiver may be similar to the radio transceiver of the telepoint station according to FIG. 4. When setting up or terminating a call from a portable radio terminal, in proximity of one of the telepoint radio transceivers connected to the transceiver controller, the portable radio terminal, the telepoint transceiver and the controller may cooperate with the PSTN in accordance with well known telepoint procedures. The telepoint transceiver controller, the telepoint radio transceivers and the portable radio terminals cooperate to enable portable radio terminal roaming and handoff when within the area covered by radio transceivers connected by cables to the same transceiver controller. The procedures include dynamic channel allocation and decision on serving radio transceiver and channel at portable radio terminal identical with or similar to correspondeing procedures at the PABX according to FIG. 3. The PSTN is not at all involved in radio channel selection, roaming or handoff for a portable radio terminal served by a radio transceiver connected by cable to the TTC. The transceiver controller and its connected radio transceivers may however also cooperate with the PSTN and a portable radio terminal in setting up a call from the PSTN to a portable terminal served by one of the radio transceivers connected to the transceiver controller in a way to be described later on.

Figure 6:
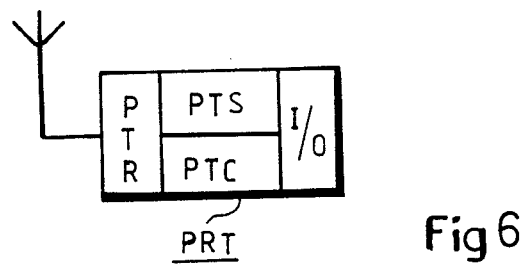
FIG. 6 illustrates a portable radio terminal.

FIG. 6 illustrates a portable radio terminal PRT which may be part of a residential subscriber equipment according to FIG. 2 or may constitute an extension to a PABX according to FIG. 3. The portable radio terminal comprises input/output means, I/O, comprising at least one of keypad or microphone or display or loudspeaker or printer. The portable radio terminal also comprises a portable terminal store, PTS, a portable terminal computer, PTC, and a portable radio terminal transceiver, PTR.

The portable radio terminal is intended to be able to be used not only at subscribers residence, if constituting part of residential equipment, or in subscribers business area, if constituting an extension to a PABX, but also proximate to a telepoint radio transceiver. Each residential radio transceiver and exchange radio transceiver and telepoint radio transceiver frequently scans and transmits radio signals on at least one of a predetermined group of radio channels. The radio signals from such a transceiver comprises information on transmitter identity and in appropriate cases PABX identity or TST identity or TTC identity. The radio signals may also comprise information on channels available at transceiver and the order in which the transceiver scans radio channels for receiving signals from portable radio terminals. An exchange radio transceiver or a telepoint radio transceiver may page a portable radio terminal by transmitting radio signals comprising identity of paged terminal on at least one of the radio channels.

A portable radio terminal frequently scans one or more or all of the radio channels of the predetermined group for receiving radio signals from proximate residential or exchange or telepoint radio transceivers, if any. Sometimes there are no radio signals or all or some of the radio signals are too weak or disturbed by noise or interfering signals. When receiving appropriate radio signals the portable radio terminal determines from received radio signals the identity of transmitting radio transceiver and possible other information on channels available etc. The information is stored in the portable terminal store separately for all present or recent active transmitters and is updated with more recent corresponding information obtained at subsequent scanning. Based on the strength and/or quality of radio signals received and/or other information on transceiver in the portable terminal store and possibly also predetermined rules the portable terminal computer chooses as serving transceiver a transceiver of appropriate radio signals received. When there are more than one possible choice the rules may give priority to possible transceiver of same subscriber equipment.

According to the present invention a portable radio terminal, choosing as serving transmitter a transmitter of a telepoint radio station or a transmitter connected to a telepoint transceiver controller, tries to inform a subscriber location store on choosen transceiver. This may be done automatically by the portable radio terminal or only after manual actuation of a pushbutton by the terminal user. If the radio terminal is part of a subscriber residential equipment the portable radio terminal tries to set up a call to the corresponding residential base radio station. The call is set up using the telepoint radio station or transceiver controller of the serving radio transceiver and the PSTN. The call set up procedure may be in accordance with well known telepoint call set up procedures. When the residential base radio station answers the call the portable radio terminal initiates transmission of a coded message comprising information on identity of calling portable radio terminal, network subscriber number of telepoint station or controller of choosen serving radio transceiver, and possibly also identity of serving radio transceiver. The residential base radio station stores at least the information on network subscriber number of telepoint station or controller of serving radio transceiver in the residential location store. Whenever thereafter receiving a call for the portable radio terminal the residential base radio station forwards the call to the network as a call for the telepoint radio station or the telepoint transceiver controller of the serving radio transceiver in accordance with the information in the residential location store.

A portable radio terminal constituting an extension to a PABX according to FIG. 3 tries to call the PABX after choosing as serving radio transceiver an other transceiver than one of the radio transceivers of the PABX. This is normally done automatically but may be initiated by the terminal user by actuating a pushbutton or other device on the terminal. The call is set up using the PSTN and serving transceiver and associated radio station or controller. The call set up procedure may be in accordance with well known telepoint or PABX or residential call set up procedures. When the called PABX answers the call the portable radio terminal initiates transmission of a coded message comprising at least information on identity of portable radio terminal and network subscriber number of residential or telepoint station or controller of choosen serving radio transceiver and possibly also identity of serving radio transceiver. The PABX stores at least information on identity of portable radio terminal and network subscriber number in the exchange location store. Whenever thereafter receiving a call for the portable radio terminal the PABX forwards the call to the network as a call for the telepoint radio station or the telepoint transceiver controller or the residential base radio station of the serving radio transceiver in accordance with the information in the exchange location store.

A call for a portable radio terminal forwarded by a residential base station or a PABX to the network as a call for a telepoint radio station or telepoint transceiver controller is forwarded by the PSTN in the same way irrespective of which portable radio terminal is intended to be the final call receiver. The call is answered by the telepoint station or transceiver controller as any call. When the telepoint radio station or transceiver controller has answered the call the residential base station or PABX having forwarded the call transmits information on identity of the portable radio terminal intended to be the final receiver of the call. This information on identity may be the network subscriber number or the branch extension number of the portable radio terminal. For establishing contact with the portable terminal the portable radio terminal must be paged by serving telepoint radio transceiver. If the portable radio terminal is served by a radio transceiver of a telepoint station having only one transceiver, paging is done from this transceiver only. If the portable radio terminal is served by a radio transceiver of a transceiver controller and has reported to the location store the network subscriber number of the controller there is more than one possible radio transceiver. The transceiver controller then initiates broadcast paging of the portable from all radio transceivers connected to the transceiver controller.

The portable radio terminal receiving the paging signals sends a response to its choosen serving radio transceiver. The response is forwarded by the radio transceiver to the transceiver controller. The transceiver controller then forwards the call to the serving radio transceiver for radio communication with the portable radio terminal. The call is then establised all the way to the portable radio terminal intended.

A residential portable radio terminal may be served by an exchange radio transceiver and be called there in a similar way if reporting to its residential location store a network subscriber number of the PABX in a similar way. Furthermore a portable radio terminal constituting an extension to one PABX may be served by an exchange radio transceiver of an other PABX. For this purpose there may be a couple of vacant extension numbers at each or some PABX for use by visiting residential or exchange portable radio terminals. When served by an exchange radio terminal a visiting portable radio terminal may be allotted one of these vacant extension numbers. The visiting portable radio terminal then reports this alloted extension number to its residential location store.

A portable radio terminal having reported to its residential or exchange location store an other serving radio transceiver than its residential or exchange transceiver may thereafter leave the area covered by this transceiver and return to the area covered by its residential transceiver or one of the exchange radio transceivers of its PABX. When returning and receiving appropriate radio signals from its residential radio transceiver or one of the exchange radio transceivers of its PABX the portable radio terminal chooses this transceiver as serving transceiver and transmits a radio signal comprising a particular reentry message. The reentry message comprises information at least on identity of portable radio terminal and preferably also information on previous serving transceiver. When receiving this information from its transceiver the residential radio base station or the PABX changes the information on the portable radio terminal concerned in its location store accordingly.

A PABX having a couple of vacant extension numbers for temporary use by visiting portable terminals may have appropriate means for temporary withdrawing from use such a vacant extension number previously allotted to a visiting portable terminal when the portable terminal is no longer served by an exchange transceiver of the PABX. Such means may comprise means for paging of assumed still visiting terminals with allotted extension numbers in order to check whether the visiting terminal with allotted extension number is still in proximity of one of the exchange transceivers of the PABX. An assumed visiting portable terminal not responding to such a paging may have its allotted extension number wuthdrawn from use. In order to be able to later on allot the withdrawn extension number to an other visiting portable terminal the PABX may call the residential base radio station or PABX of the visiting portable terminal and inform its location store on the withdrawal of the use of the extension number by the portable terminal. The PABX does not allot the withdrawn extension number to an other visiting portable terminal until the called residential base radio station or PABX has answered the call regarding withdrawal of allotted extension number or after a long timeout, whereby two portable terminals using same extension number is avoided.

Some PSTN comprise means for transferring calls from a called subscriber to another subscriber. Such call transfer means may be used by a subscriber visiting an other subscriber and wishing to receive his calls at the visiting subscriber. A PSTN comprising call transfer means comprises a call transfer store for receiving from subscribers information on other subscribers where they want their calls. For the purpose of call transfer a subscriber normally transmits to his local station a message comprising information on the network subscriber number(s) of the subscriber where he want his calls. After receiving such information the PSTN does not forward a call to a subscriber in accordance with the normal information in the network subscriber store but forwards any call to the subscriber in accordance with received information stored in the call transfer store.

A telepoint radio station or a telepoint transceiver controller may also store identity of served portable radio terminals and frequently page assumed served portable radio terminals for checking their presence in a similar way. The telepoint waits for answers to such paging of assumed served portable radio terminals. When not receiving a response to a paging of a portable terminal the telepoint sets up a call for reporting to appropiate location store the identity of the assumed served portable terminal not answering to such paging. The information in the location store may be changed accordingly. Call transfer means in a PSTN may be used simultaneously with or instead of location stores in residential base station or PABX for transferring calls from a subscriber site to a telepoint station or controller. When used instead of such location stores the portable radio station is programmed to call a network number dedicated to the call transfer means instead of its owm network subscriber number for rapporting serving radio transceivers. Neither when the call transfer means of the PSTN is used together with the location store nor when the call transfer means of the PSTN is used instead of the location stores must there be any amendments of the PSTN in order to be able to call a portable radio terminal served by a telepoint radio transceiver.

The invention is neither restricted to described embodiments of PRT or RBS or TSN or TTR or TTC or XTR or PABX nor to the particular PSTN described but may be implemented in somewhat different ways.

We claim:

1. A combination of a public switched telecommunication network, a automatic branch exchange connected to the telecommunication network, plural portable radio terminals constituting extensions to the branch exchange, and a telepoint radio station connected to the telecommunication network;

the telecommunication network comprising a network subscriber store for information on network subscribers including the branch exchange and the telepoint station, means for connecting subscriber equipment to the network, and means for setting up calls to and from connected subscriber equipment in accordance with information in the network subscriber store;

the branch exchange comprising an exchange switch, exchange radio transceivers connected to the switch, and an extension location store for information on portable radio terminals constituting extension terminals to the branch exchange;

the telepoint radio station comprising a telepoint radio transceiver for radio communication with portable radio terminals, means for receiving an access request from and forwarding a call from a served portable radio terminal to the telecommunication network, means for paging a served radio terminal called by the telecommunication network, and means for forwarding a call from the telecommunication network to a paged and responding served portable radio terminal;

the portable radio terminal comprising means for scanning of radio channels used by exchange radio transceiver or telepoint radio transceiver, means for receiving radio signals at scanning. and determining from received radio signals information on identity of transmitting transceiver, if any, means for choosing as serving transceiver a transceiver of appropriate received radio signals, if any, and means for calling via a telepoint station and the network the branch exchange to whom the portable radio terminal constitutes an extension and reporting to the extension location store the identity of choosen radio transceiver when other than one of the exchange radio transceivers of the same branch exchange;

in which combination a call to a portable radio terminal constituting an extension to a private branch exchange being set up by the telecommunication network to the branch exchange in accordance with information on the portable radio terminal in the network subscriber store; and when receiving a call from the network to a portable radio terminal having reported to the extension location store as being served by a telepoint radio transceiver the branch exchange forwarding the call back to the telecommunication network as a call to the telepoint station comprising the serving radio transceiver.

2. A combination according to claim 1 comprising plural subscriber residential equipments for subscribers to the network, each subscriber residential equipment comprising a residential base radio station connected to the network and a portable radio terminal;

the residential base radio station comprising a residential radio transceiver for radio communication with the portable radio terminal and a residential location store for information on the portable radio terminal constituting part of the same subscriber residential equipment;

the portable radio terminal of the subscriber residential equipment comprising means for scanning of radio channels used by the residential radio transceiver or exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint station or a branch exchange the residential base radio station constituting part of the same subscriber equipment and reporting to the residential location store the identity of choosen radio transceiver when other than the residential radio transceiver constituting part of the same subscriber residential equipment;

in which combination a call to a portable radio terminal constituting part of a subscriber residential equipment being set up by the telecommunication network to the residential base radio station constituting part of the same subscriber equipment in accordance with information on the portable radio terminal in the network subscriber store; and when receiving a call from the network to a portable radio terminal having reported to the residential location store as being served by an other transceiver the residential base radio station forwarding the call back to the telecommunication network as a call to the telepoint radio station or branch exchange comprising the serving transceiver.

3. A combination according to claim 1 wherein the branch exchange comprises plural extension numbers for temporary use by visiting portable radio terminals not normally constituting extensions to the branch exchange;

the branch exchange allotting a vacant extension number to a visiting portable radio terminal to be served by an exchange transceiver of the branch exchange;

the branch exchange paging visiting portable radio terminals having allotted extension numbers of the exchange;

the branch exchange withdrawing from use allotted extension numbers of visiting portable radio terminals not responding to paging; and the branch exchange setting up a call through the switched network for informing the location store of the visiting portable radio terminal on the withdrawal of the use of the allotted extension number.

4. A combination of a switched telecommunication network, a branch exchange connected to the telecommunication network, a plurality of portable radio terminals constituting extension terminals to the branch exchange, a telepoint transceiver controller connected to the telecommunication network, and a plurality of telepoint radio transceivers connected to the telepoint transceiver controller;

the telecomminication network comprising a network subscriber store for information on network subscribers including the branch exchange and the telepoint transceiver controller, means for connecting subscriber equipment to the network, and means for setting up calls to and from connected subscriber equipment in accordance with information in the subscriber store;

the branch exchange comprising an exchange switch, exchange radio transceivers connected to the switch, and an extension location store for information on portable radio terminals constituting extension terminals to the branch exchange;

each telepoint radio transceviver comprising means for paging of a portable radio terminal upon request by the telepoint transceiver controller, means for receiving and forwarding to the telepoint transceiver controller responses to paging, and means for receiving access requests from portable radio terminals and forwarding them to the telepoint transceiver controller;

the telepoint transceiver controller comprising means for receiving a call from the telecommunication network to a portable terminal and initiating a broadcast paging of the portable terminal from all telepoint radio transceivers connected to the telepoint transceiver controller, means for receiving a response to a paging from a telepoint radio transceiver or an access request from a telepoint radio transceiver and forwarding a call to or from a portable radio terminal via a connected serving telepoint radio transceiver to the telecommunication network;

the portable radio terminal comprising means for scanning of radio channels used by exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint radio transceiver and transceiver controller the branch exchange to whom the portable radio terminal constitutes an extension and reporting to the branch exchange extension location store the identity of the telepoint transceiver controller of the choosen radio transceiver when a telepoint radio transceiver is choosen as serving transceiver;

in which combination a call to a portable radio terminal constituting an extension to a private branch exchange being set up by the telecommunication network to the branch exchange in accordance with information on the portable radio terminal in the network subscriber store; and when receiving a call from the network to a portable radio terminal having reported to the extension location store as being served by a telepoint radio transceiver the branch exchange forwarding the call back to the telecommunication network as a call to the telepoint transceiver controller connected to the serving telepoint radio transceiver.

5. A combination according to claim 4 comprising plural subscriber residential equipments for subscribers to the network, each subscriber residential equipment comprising a residential base radio station connected to the network and a portable radio terminal;

the residential base radio station comprising a residential radio transceiver and a residential location store for information on the portable radio terminal constituting part of the same subscriber residential equipment;

the portable radio terminal of the subscriber residential equipment comprising means for scanning of radio channels used by the residential radio transceiver or exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint transceiver controller or a branch exchange the residential base radio station constituting part of the same subscriber equipment and reporting to the residential location store the identity of choosen radio transceiver when other than the residential radio transceiver constituting part of the same subscriber residential equipment;

in which combination a call to a portable radio terminal constituting part of a subscriber residential equipment being set up by the telecommunication network to the residential base radio station constituting part of the same subscriber equipment in accordance with information on the portable radio terminal in the network subscriber store; and when receiving a call from the network to a portable radio terminal having reported to the residential location store as being served by an other transceiver than the residential radio transceiver the residential base radio station forwarding the call back to the telecommunication network as a call to the telepoint transceiver controller of the serving telepoint radio transceiver or the branch exchange of the ser-ving exchange radio transceiver.

6. A combination according to claim 4 wherein the branch exchange comprises plural extension numbers for temporary use by visiting portable radio terminals not normally constituting extensions to the branch exchange;

the branch exchange allotting a vacant extension number to a visiting portable radio terminal to be served by an exchange transceiver of the branch exchange;

the branch exchange paging visiting portable radio terminals having allotted extension numbers of the exchange;

the branch exchange withdrawing from use allotted extension numbers of visiting portable radio terminals not responding to paging; and the branch exchange setting up a call through the switched network for informing the location store of the visiting portable radio terminal on the withdrawal of the use of the allotted extension number.

7. A combination of a public switched telecommunication network, a telepoint radio station connected to the telecommunication network and a subscriber residential equipment comprising a residential base radio station connected to the telecommunication network and a portable radio terminal;

the telecommunication network comprising a network subscriber store for information on network subscribers including the subscriber residential equipment and the telepoint station, means for connecting subscriber equipment to the network, and means for setting up calls to and from connected subscriber equipment in accordance with information in the network subscriber store;

the telepoint radio station comprising a telepoint radio transceiver for radio communication with portable radio terminals, means for receiving an access request from and forwarding a call from a served portable radio terminal to the telecommunication network, means for paging a served radio terminal called by the telecommunication network, and means for forwarding a call from the telecommunication network to a paged and responding served portable radio terminal;

the residential base radio station comprising a residential radio transceiver for radio communication with the portable radio terminal and a residential location store for information on the portable radio terminal constituting part of the same subscriber residential equipment;

the portable radio terminal of the subscriber residential equipment comprising means for scanning of radio channels used by the residential radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint station and the telecommunication network the residential base radio station constituting part of the same subscriber equipment and reporting to the residential location store the identity of choosen radio transceiver when other than the residential radio transceiver constituting part of the same subscriber residential equipment;

in which combination a call to a portable radio terminal constituting part of a subscriber residential equipment being set up by the telecommunication network to the residential base radio station constituting part of the same subscriber equipment in accordance with information on the portable radio terminal in the network subscriber store; and when receiving a call from the network to a portable radio terminal having reported to the residential location store as being served by an other transceiver the residential base radio station forwarding the call back to the telecommunication network as a call to the telepoint radio station comprising the serving transceiver.

8. A combination according to claim 7 wherein the telepoint radio station stores identities of served portable radio terminals; the telepoint station pages served portable radio terminals in order to check the presense of served portable radio terminal; the telepoint station waits for answers to its paging from paged served portable radio terminals; and the telepoint station sets up a call through the switched network for informing the location store of a non answering previously served portable radio terminal that the portable radio terminal is no longer served by the telepoint.

9. A combination of a public switched telecommunication network, a telepoint transceiver controller connected to the telecommunication network, a plurality of telepoint radio transceivers connected to the telepoint transceiver controller, a subscriber residential equipment comprising a residential base radio station connected to the telecommunication network and a portable radio terminal;

the telecommunication network comprising a network subscriber store for information on network subscribers including the subscriber residential equipment and the telepoint transceiver controller, means for connecting subscriber equipment to the network, and means for setting up calls to and from connected subscriber equipment in accordance with information in the network subscriber store;

each telepoint radio transceviver comprising means for paging of a portable radio terminal upon request by the telepoint transceiver controller, means for receiving and forwarding to the telepoint transceiver controller responses to paging, and means for receiving access requests from portable radio terminals and forwarding them to the telepoint transceiver controller;

the telepoint transceiver controller comprising means for receiving a call from the telecommunication network to a portable terminal and initiating a broadcast paging of the portable terminal from all telepoint radio transceivers connected to the telepoint transceiver controller, means for receiving a response to a paging from a telepoint radio transceiver or an access request from a telepoint radio transceiver and forwarding a call to or from a portable radio terminal via a connected serving telepoint radio transceiver to the telecommunication network;

the residential base radio station comprising a residential radio transceiver for radio communication with the portable radio terminal and a residential location store for information on the portable radio terminal constituting part of the same subscriber residential equipment;

the portable radio terminal of the subscriber residential equipment comprising means for scanning of radio channels used by the residential radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint station and the telecommunication network the residential base radio station constituting part of the same subscriber equipment and reporting to the residential location store the identity of choosen radio transceiver when other than the residential radio transceiver constituting part of the same subscriber residential equipment;

in which combination a call to a portable radio terminal constituting part of a subscriber residential equipment being set up by the telecommunication network to the residential base radio station constituting part of the same subscriber equipment in accordance with information on the portable radio terminal in the network subscriber store; and when receiving a call from the network to a portable radio terminal having reported to the residential location store as being served by telepoint radio transceiver the residential base radio station forwarding the call back to the telecommunication network as a call to the telepoint transceiver controller connected to the serving telepoint radio transceiver.

10. A combination according to claim 9 wherein the telepoint transceiver controller stores identities of served portable radio terminals;

the telepoint transceiver initiates broadcast paging of served portable radio terminals in order to check the accessability of served portable radio terminal;

the telepoint transceiver controller waits for answers to the broadcast paging from paged served portable radio terminals; and the telepoint transceiver controller sets up a call through the switched network for informing the location store of a non answering previously served portable radio terminal that the portable radio terminal is no longer served by the telepoint.

11. A combination of a public switched telecommunication network, a private automatic branch exchange connected to the telecommunication network, plural portable radio terminals constituting extensions to the branch exchange, and a telepoint radio station connected to the telecommunication network;

the telecommunication network comprising a network subscriber store for information on network subscribers including the branch exchange and the telepoint station, means for connecting subscriber equipment to the network, and means for setting up calls to and from connected subscriber equipment in accordance with information in the network subscriber store;

the branch exchange comprising an exchange switch, exchange radio transceivers connected to the switch, and an extension location store for information on portable radio terminals constituting extension terminals to the branch exchange;

the telepoint radio station comprising a telepoint radio transceiver for radio communication with portable radio terminals, means for receiving an access request from and forwarding a call from a served portable radio terminal to the telecommunication network, means for receiving a call from the network, means for paging a served radio terminal according to information in a call from the telecommunication network, and means for forwarding a call from the telecommunication network to a paged and responding served portable radio terminal;

the portable radio terminal comprising means for scanning of radio channels used by exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint station and the network the branch exchange to whom the portable radio terminal constitutes an extension or the network subscriber store and reporting to the extension location store or the network subscriber store the identity of choosen radio transceiver when other than one of the exchange radio transceivers of the same branch exchange;

the telecommunication network, when receiving a call to a portable radio terminal constituting an extension to a private branch exchange, setting up a call to the branch exchange or to the telepoint station in accordance with information on the portable radio terminal in the network subscriber store; and the branch exchange when receiving a call to a portable radio terminal having reported to the extension location store as being served by a telepoint radio transceiver forwarding the call to the telecommunication network as a call to the telepoint station comprising the serving radio transceiver.

12. A combination according to claim 11 wherein the branch exchange comprises plural extension numbers for temporary use by visiting portable radio terminals not normally constituting extensions to the branch exchange;
   the branch exchange allotting a vacant extension number to a visiting portable radio terminal to be served by an exchange transceiver of the branch exchange;
   the branch exchange paging visiting portable radio terminals having allotted extension numbers of the exchange;
   the branch exchange withdrawing from use allotted extension numbers of visiting portable radio terminals not responding to paging; and
   the branch exchange setting up a call through the switched network for informing the location store of the visiting portable radio terminal on the withdrawal of the use of the allotted extension number.

13. A combination of a switched telecommunication network, a branch exchange connected to the telecommunication network, a plurality of portable radio terminals constituting extension terminals to the branch exchange, a telepoint transceiver controller connected to the telecommunication network, and a plurality of telepoint radio transceivers connected to the telepoint transceiver controller;
   the telecomminication network comprising a network subscriber store for information on network subscribers including the branch exchange and the telepoint transceiver controller, means for connecting subscriber equipment to the network, and means for setting up calls to and from connected subscriber equipment in accordance with information in the subscriber store;
   the branch exchange comprising an exchange switch, exchange radio transceivers connected to the switch, and an extension location store for information on portable radio terminals constituting extension terminals to the branch exchange;
   each telepoint radio transceviver comprising means for paging of a portable radio terminal upon request by the telepoint transceiver controller, means for receiving and forwarding to the telepoint transceiver controller responses to paging, and means for receiving access requests from portable radio terminals and forwarding them to the telepoint transceiver controller;
   the telepoint transceiver controller comprising means for receiving a call from the telecommunication network to a portable terminal and initiating a broadcast paging of the portable terminal from all telepoint radio transceivers connected to the telepoint transceiver controller, means for receiving a response to a paging from a telepoint radio transceiver or an access request from a telepoint radio transceiver and forwarding a call to or from a portable radio terminal via a connected serving telepoint radio transceiver to the telecommunication network;
   the portable radio terminal comprising means for scanning of radio channels used by exchange radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint radio transceiver and transceiver controller the branch exchange to whom the portable radio terminal constitutes an extension or the network subscriber store and reporting to the branch exchange extension location store or to the network subscriber store the identity of the telepoint transceiver controller of the choosen radio transceiver when a telepoint radio transceiver is choosen as serving transceiver;
   the telecommunication network when receiving a call to a portable radio terminal constituting an extension to a private branch exchange setting up a call to the branch exchange or to the telepoint transceiver controller in accordance with information on the portable radio terminal in the network subscriber store; and
   the branch exchange when receiving a call to a portable radio terminal having reported to the extension location store as being served by a telepoint radio transceiver forwarding the call to the telecommunication network as a call to the telepoint transceiver controller comprising the serving radio transceiver.

14. A combination according to claim 13 wherein the branch exchange comprises plural extension numbers for temporary use by visiting portable radio terminals not normally constituting extensions to the branch exchange;
   the branch exchange allotting a vacant extension number to a visiting portable radio terminal to be served by an exchange transceiver of the branch exchange;
   the branch exchange paging visiting portable radio terminals having allotted extension numbers of the exchange in order to check their presence;
   the branch exchange awaits answers from paged visiting portable radio terminals;
   the branch exchange withdrawing from use allotted extension numbers of visiting portable radio terminals not responding to paging; and
   the branch exchange setting up a call through the switched network for informing the location store of the visiting portable radio terminal on the withdrawal of the use of the allotted extension number.

15. A combination of a public switched telecommunication network, a telepoint radio station connected to the telecommunication network and a subscriber residential equipment comprising a residential base radio station connected to the telecommunication network and a portable radio terminal;
   the telecommunication network comprising a network subscriber store for information on network subscribers including the subscriber residential equipment and the telepoint station, means for connecting subscriber equipment to the network, and means for setting up calls to and from connected subscriber equipment in accordance with information in the network subscriber store;
   the telepoint radio station comprising a telepoint radio transceiver for radio communication with portable radio terminals, means for receiving an access request from and forwarding a call from a served portable radio terminal to the telecommunication network, means for receiving a call from the network, means for paging a served radio terminal according to information in a call from the telecommunication network, and means for forwarding a call from the telecommunication network to a paged and responding served portable radio terminal;

the residential base radio station comprising a residential radio transceiver for radio communication with the portable radio terminal and a residential location store for information on the portable radio terminal constituting part of the same subscriber residential equipment;

the portable radio terminal of the subscriber residential equipment comprising means for scanning of radio channels used by the residential radio transceiver or telepoint radio transceiver, means for receiving radio signals at scanning and determining from received radio signals information on identity of transmitting transceiver, if any, means for choosing as serving transceiver a transceiver of appropriate received radio signals, if any, and means for calling via a telepoint station and the telecommunication network the residential base radio station constituting part of the same subscriber equipment or the network subscriber store and reporting to the residential location store or the network subscriber store the identity of choosen radio transceiver when other than the residential radio transceiver constituting part of the same subscriber residential equipment;

the telecommunication network when receiving a call to a portable radio terminal constituting part of a subscriber residential equipment setting up the call to the residential base radio station constituting part of the same subscriber equipment or the telepoint radio station in accordance with information on the portable radio terminal in the network subscriber store; and when receiving a call to a portable radio terminal having reported to the residential location store as being served by an other transceiver the residential base radio station forwarding the call to the telecommunication network as a call to the telepoint radio station comprising the serving transceiver.

* * * * *